(12) United States Patent
Blakeley (10) Patent No.: US 8,168,917 B2
(45) Date of Patent: May 1, 2012

(54) SYSTEM AND METHOD FOR LASER-ENCODING INFORMATION ON HYDRAULIC RODS

(75) Inventor: Philip John Blakeley, Linton (GB)

(73) Assignee: Caterpillar Inc., Peoria, IL (US)

( * ) Notice: Subject to any disclaimer, the term of this patent is extended or adjusted under 35 U.S.C. 154(b) by 1737 days.

(21) Appl. No.: 11/442,142

(22) Filed: May 30, 2006

(65) Prior Publication Data

US 2007/0278192 A1 Dec. 6, 2007

(51) Int. Cl.
*B23K 26/00* (2006.01)
(52) U.S. Cl. ......................................... 219/121.6
(58) Field of Classification Search ............. 219/121.63, 219/121 L; 235/462, 487, 385; 91/1
See application file for complete search history.

(56) References Cited

U.S. PATENT DOCUMENTS

| | | | |
|---|---|---|---|
| 4,822,987 A * | 4/1989 | Goldenfield et al. ......... 235/487 |
| 5,463,200 A | 10/1995 | James et al. |
| 5,463,202 A * | 10/1995 | Kurosawa et al. ....... 219/121.83 |
| 5,539,993 A | 7/1996 | Kilpinen et al. |
| 5,632,916 A | 5/1997 | Lappalainen et al. |
| 5,642,297 A | 6/1997 | Brady et al. |
| 5,856,648 A | 1/1999 | Frauchiger et al. |
| 5,886,317 A | 3/1999 | Hinrichs et al. |
| 5,918,199 A | 6/1999 | Yang et al. |
| 6,068,966 A | 5/2000 | Koga |
| 6,556,946 B2 | 4/2003 | Sewell |
| 6,710,288 B2 * | 3/2004 | Liu et al. ..................... 219/121.7 |
| 6,834,574 B2 * | 12/2004 | Neumann ............................ 91/1 |
| 7,252,235 B2 * | 8/2007 | Kucher et al. ............ 235/462.16 |
| 7,513,907 B2 * | 4/2009 | Lau et al. ..................... 623/1.15 |
| 2005/0120875 A1 | 6/2005 | Neumann |
| 2005/0257708 A1 * | 11/2005 | Sousa ........................... 101/467 |
| 2006/0022047 A1 | 2/2006 | Sewell et al. |

FOREIGN PATENT DOCUMENTS

| WO | WO 92/02368 | * | 2/1992 |
| WO | WO 92/02368 A1 | * | 2/1992 |

* cited by examiner

*Primary Examiner* — Henry Yuen
*Assistant Examiner* — Thien S Tran
(74) *Attorney, Agent, or Firm* — Finnegan, Henderson, Farabow, Garrett & Dunner LLP (57) ABSTRACT

A system for encoding information on a movable object including a laser optically coupled to a moveable object, wherein the moveable object includes a circumferential surface and a longitudinal axis. The laser is configured to project concentrated electromagnetic radiation onto the moveable object. The concentrated electromagnetic radiation heats a portion of the surface of the moveable object affected by the radiation so as to anneal the portion of the surface affected by the radiation, thereby modifying the reflective characteristics of the annealed portion. The system also includes a mounting apparatus configured to adaptively position the moveable object relative to the laser. The system further includes a controller in communication with the laser and the mounting apparatus and configured to control one or more of the mounting apparatus and the laser to project a desired encoding pattern onto the moveable object.

21 Claims, 4 Drawing Sheets

SYSTEM AND METHOD FOR LASER-ENCODING INFORMATION ON HYDRAULIC RODS

TECHNICAL FIELD

The present disclosure relates generally to laser-encoding systems and, more particularly, to a system and method for laser encoding of position information onto hydraulic rods.

BACKGROUND

Many electromechanical machines use one or more hydraulic or pneumatic systems for performing tasks associated with an industry such as mining, transportation, agriculture, construction, or power generation. These systems may include a moveable object, such as a rod, piston, or cylinder coupled to a work tool on one end and a chamber on the other. Fluid may be provided in the chamber to extend the moveable object along a linear path, typically for several meters. The fluid may be removed from the chamber in order to retract the moveable object along the same path. In certain situations, the precise position of the moveable object may be required for performing certain tasks and/or for automating certain processes associated with the machine.

In some machines, position identification systems are used to determine an absolute position or location of a moveable object within the chamber. These systems typically include markings, such as barcodes, that are laser-etched or deposited along the length of the moveable object. These markings may be detected by optical sensors positioned within the chamber associated with the moveable object. The sensors may scan a portion of the barcode as it passes across a lens and decode the scanned portion to determine a position associated with the moveable object within the chamber.

The proper operation and accuracy of these identification systems is dependent upon the precision and durability of the markings on the moveable object. For example, over time, markings that are painted or etched onto the surface may wear, making detection by the optical sensors difficult. Furthermore, as the precision required by the position system increases, the size of the markings (and spacing between them) becomes more compact. Thus, in order to provide durable markings that include the small-scale precision necessary for accurate position identification, a laser-encoding system with fine adjustment capability that produces high resolution surface markings, may be required.

One method for providing durable, permanent markings on the surface of a moveable object is described in U.S. Pat. No. 5,632,916 ("the '916 patent") to Lappalainen et al. The '916 patent describes a method for producing marks on a metal surface. These marks may be produced by providing a series of successive laser pulses, each producing a trace on the metal surface. Each trace overlaps a previous trace in order to modify the color of the surface piston rod in order to mark the metal surface.

Although the '916 patent may provide a method for forming durable, wear resistant markings using a laser, it may still be inadequate. For example, the method described in the '916 patent does not provide a controllable mounting apparatus for adjusting of the metal surface with respect to the laser. Thus, the system of the '916 patent may not allow precision-controlled adjustment of the surface with respect to the laser. As a result, should one or more of the laser or the metal surface become misaligned, the system of the '916 patent may not adequately correct the misalignment, potentially leading to erroneous and/or imprecise marking of the metal surface.

The disclosed system and method for laser-encoding information onto moveable objects is directed toward overcoming one or more of the problems set forth above.

SUMMARY OF THE INVENTION

In accordance with one aspect, the present disclosure is directed toward a system for encoding information on a moveable object, the moveable object including a circumferential surface and a longitudinal axis. The system may include a laser optically coupled to a moveable object and configured to project concentrated electromagnetic radiation onto the moveable object. The concentrated electromagnetic radiation may heat a portion of the surface of the moveable object affected by the radiation so as to anneal the portion of the surface affected by the radiation, thereby modifying the reflective characteristics of the annealed portion. The system may also include a mounting apparatus configured to adaptively position the moveable object relative to the laser. The system may further include a controller in communication with the laser and the mounting apparatus and configured to control one or more of the mounting apparatus and the laser for projecting a desired encoding pattern onto the moveable object.

According to another aspect, the present disclosure is directed toward a method for encoding information on a moveable object, the moveable object including a circumferential surface and a longitudinal axis. The method may include positioning the moveable object relative to a laser configured to project concentrated electromagnetic radiation onto the moveable object. The method may also include projecting, by the laser, the concentrated electromagnetic radiation onto the moveable object whereby the concentrated electromagnetic radiation heats a portion of the surface of the moveable object affected by the radiation so as to anneal the portion of the surface affected by the radiation, thereby modifying the reflective characteristics of the annealed portion. The system may further include adjusting a position of the moveable object if an incident characteristic associated with the electromagnetic radiation exceeds an incident threshold value.

DETAILED DESCRIPTION

Figure 1:
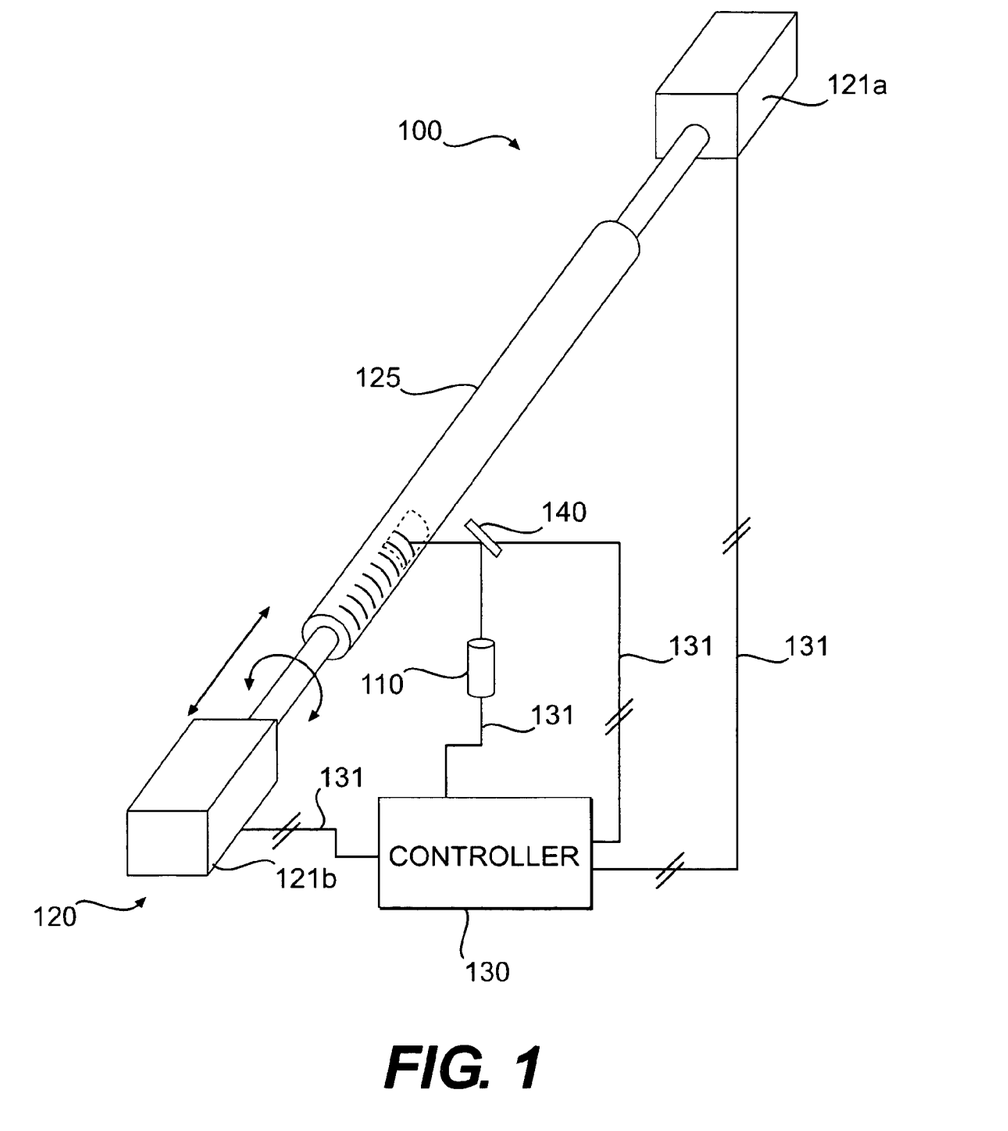
FIG. 1 provides a diagrammatic perspective view of an exemplary system for laser encoding information onto moveable objects according to the disclosed embodiments.

FIG. 1 illustrates an exemplary system 100 for encoding information on moveable objects consistent with the disclosed embodiments. As illustrated in FIG. 1, system 100 may include one or more components and/or subsystems that cooperate to encode information onto a surface of a moveable object. For purposes of the present disclosure, moveable object may include any object comprising a circumferential surface and longitudinal axis, such as a rod, piston, or hydraulic cylinder. According to one embodiment, a moveable object 125 may be constructed of a metallic material such as steel, iron, or aluminum, although other types of materials may be also be used. System 100 may include, among other things, a laser 110, a mounting apparatus 120 for grasping and positioning a moveable object 125, a controller 130, and, optionally, a galvanometer 140. It is contemplated that system 100 may include additional, fewer, and/or different components than those listed above. It is understood that the components listed above are exemplary only and not intended to be limiting.

Laser 110 may include any device configured to project concentrated electromagnetic radiation onto a surface of moveable object 125. Concentrated electromagnetic radiation may include any type of radiation that, when applied to a surface of moveable object 125, heats a portion of the surface corresponding to the concentrated electromagnetic radiation. For example, concentrated electromagnetic radiation may include, among other things, high-power microwave, millimeter-wave, ultraviolet, optical, infrared, or any other type of high power electromagnetic radiation. The local heating of the moveable object in this manner, when followed by subsequent cooling of the portion of the surface subjected to the radiation, may anneal the surface of moveable object 125 so as to alter the reflective properties of the affected portion.

Laser 110 may include any type of laser for generating a level of concentrated electromagnetic radiation required to heat a portion of the surface of moveable object 125 to a predetermined temperature. For example, laser 110 may include a solid state laser (e.g., yttrium-aluminum garnet (YAG), ruby, etc.), a gas laser (e.g., carbon dioxide, carbon monoxide, etc.), or an excimer laser (e.g., helium, argon, etc.). According to one embodiment, laser 110 may include a Q-switched YAG laser operating in the $TEM_0$ mode.

Mounting apparatus 120 may include one or more components configured to receive, hold, secure, position, rotate, shift, elevate, and/or otherwise move moveable object 125 during processing by laser 110. For example, as illustrated in FIG. 1, mounting apparatus may include opposable holding devices 121a-b configured to grasp moveable object 125 on either end. Holding devices 121a-b may each include rotating devices (not shown) configured to rotate moveable object 125 in a circumferential direction. Alternatively and/or additionally holding devices 121a-b may include shift devices (not shown) configured to shift moveable object 125 in a axial direction (i.e., longitudinally). Although mounting apparatus 120 is illustrated as an opposable clamping device, it is contemplated that mounting apparatus 120 may include any apparatus for holding and positioning moveable object 125. For example, mounting apparatus 120 may include a mounting table for holding moveable object 125. The mounting table may include a receiving chamber for holding movable object 125. The mounting table may also include positional motors for rotationally and axially positioning moveable object 125 with respect to laser 110.

Mounting apparatus 120 may be configured to provide desired adjustments in the position of the moveable object 125. For example, the rotating devices associated with mounting apparatus 120 may be configured to provide precision rotational adjustment (i.e., fraction of a degree) of moveable object 125. Similarly, the shift devices associated with mounting apparatus 120 may be configured to shift moveable object 125 in very small increments (e.g., 10-50 micrometers).

System 100 may optionally include a galvanometer 140 for directing the electromagnetic radiation associated with laser 110. For example, galvanometer 140 may include an electronically-controlled reflective device (e.g., prism, mirror, etc.) configured to direct the electromagnetic radiation provided by laser 110. Galvanometer 140 may orient the reflective device relative to moveable object 125 based on control signals received from controller 130 associated with system 100.

Although certain embodiments of system 100 are illustrated as containing galvanometer 140, it is contemplated that galvanometer 140 is an optional component of system 100. Accordingly, laser 110 may be configured to project the electromagnetic radiation directly onto moveable object 125, without the use of galvanometer 140.

Controller 130 may include components for executing computer-readable instructions and programs. These components may include, for example, one or more memory devices, a storage device, a central processing unit, an interface, and input device, or any other suitable component for running an application. For example, controller 130 may include an input device configured to receive information from a user that may be encoded on the surface of moveable object 125 using the method and processes described below.

Controller 130 may be configured to monitor, control, adjust, analyze, and/or process one or more characteristics associated with system 100. These characteristics may include, for example, a position, orientation, or configuration of one or more of the laser, the mounting apparatus 120, and/or the galvanometer 140; a rotation or shift associated with each of holding devices 121a-b; a power level and/or frequency of laser 110; and an X-Y orientation associated with the galvanometer 140. For example, controller 130 may be configured to control the position of mounting apparatus 120, while pulsing laser 110 to generate a desired pattern on the surface of moveable object 125.

Controller 130 may be in communication with one or more components associated with system 100. For example, controller 130 may be in communication with laser 110, mounting apparatus 120 and, if equipped, galvanometer 140 via communication lines 131. Various other components may be associated with controller 130 such as sensing devices (not shown) for monitoring one or more operational aspects associated with certain components of system 100, power supply circuitry, signal conditioning circuitry, and other appropriate circuitry.

Figure 2A:
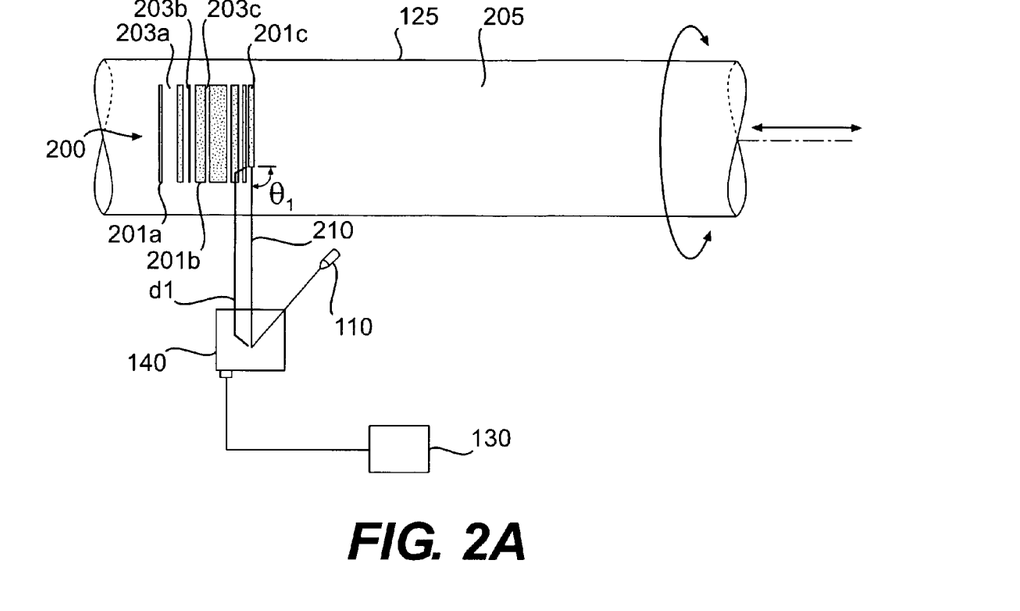
FIG. 2A provides a diagrammatic front view of a laser encoding system in accordance with the disclosed embodiments.
Figure 2B:
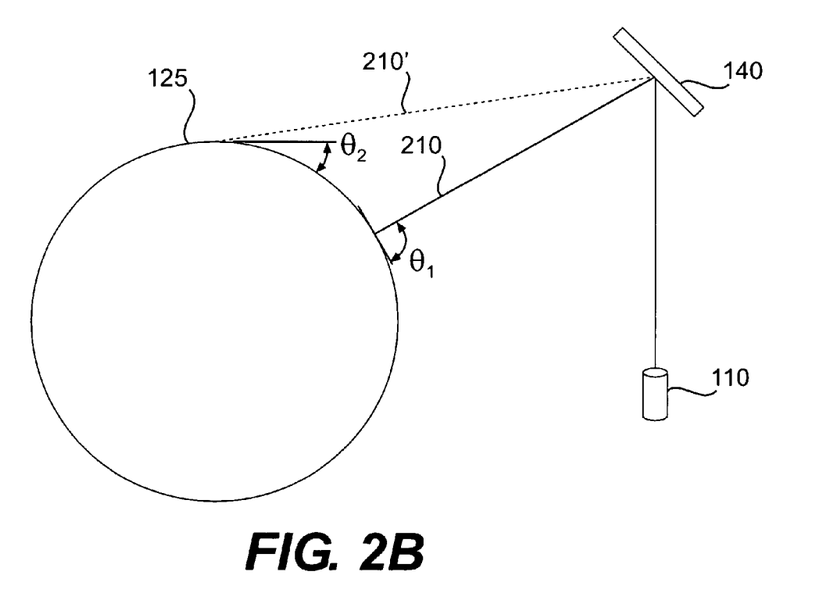
FIG. 2B provides a diagrammatic side view of a laser encoding system in accordance with the disclosed embodiments.

FIGS. 2A and 2B illustrate exemplary front and side views, respectively, of system 100 to illustrate exemplary processes consistent with the disclosed embodiments. As shown in FIG. 2A, information may be encoded on the surface of moveable object 125 in a manner consistent with the disclosed embodiments. Encoded information may include any information that may be transferred onto the surface of moveable object 125 using laser 110, such as, for example, position information, part identification numbers, manufacturing information, stock keeping unit (SKU) number, inventory number, or any other type of information that may be encoded onto moveable object 125. Encoded information may include markings, lines, symbols, or other indicia provided on the surface of moveable object 125.

According to one embodiment, encoded information may be in the form of a barcode 200, which may be identified by an optical scan sensor configured to read and decode the encoded information to retrieve the relevant information contained in the code. As illustrated in FIG. 2A, barcode 200 may include a plurality of linear or rectangular markings. The collective arrangement of these markings may provide information as to the absolute position and/or orientation of moveable object 125, when read by an optical scanner.

System 100 may project the encoded information onto moveable object 125 by directing concentrated electromagnetic radiation onto a portion of the surface corresponding to a desired pattern. In the barcode arrangement illustrated in FIG. 2A, the pattern may include a plurality of markings 201a-c separated by a plurality of spacings 203a-c. According to one exemplary embodiment, each marking may include a linear or rectangular symbol, 10 mm-20 mm in length in the circumferential direction and an integer multiple of 50 micrometers (e.g., 50 microns, 100 microns, 150 microns, etc.) in width extending in the axial direction. It is contemplated that other lengths and widths of markings 201a-c may be used. Thus, the size, shape, length, and width of each marking is exemplary only and not intended to be limiting. It is contemplated that other configurations and orientations of the encoded information may be realized such as, for example, a barcode in which the plurality of lines have lengths that extend in the axial direction and adjacently arranged circumferentially around moveable object 125. In this configuration, position information may be provided to determine a rate and/or location of a rotational position of moveable object 125.

System 100 may be configured to form markings 201a-c by projecting concentrated electromagnetic radiation onto the surface of moveable object 125 using laser 110. The electromagnetic radiation may heat the surface in such a manner as to modify the physical structure of the portions affected by the electromagnetic radiation. The subsequent cooling of the heated portions changes the physical properties, such as the color, reflective properties, etc. This process, known as annealing, provides a method for indelibly marking the surface of moveable object 125. In addition, the marking created by this process are typically resistant to wear and fading due to the strengthening of the surface of the annealed area.

The formation of the markings on the surface of moveable object 125 may be dependent on certain incident characteristics associated with the electromagnetic radiation. These characteristics may include, for example, a distance d1, d2 of the source (e.g., galvanometer 140, laser 110, etc.) from the surface of moveable object 125; an angle of incidence ($\theta_1$, $\theta_2$, $\phi_1$, or $\phi_2$); an intensity of the electromagnetic radiation at the surface of moveable object 125; and/or a dispersion factor associated with the focus of the radiation at the surface.

In order to concentrate the radiation to provide the precision required to create the markings, controller 130 may control one or more components and/or characteristics associated with system 100. For example, controller 130 may adjust a position associated with one or more of laser 110, mounting apparatus 120, and/or galvanometer 140 to modify the distance that the radiation travels before impacting the surface. As a result, dispersion, attenuation, and intensity associated with the electromagnetic radiation may be manipulated and/or controlled by system 100 through the use of controller 130.

Methods and systems consistent with the disclosed embodiments may allow users to encode information onto a moveable object (such as a rod, a cylinder, a piston, etc.) using concentrated electromagnetic radiation to anneal a particular pattern onto the surface of the object. Methods and systems also allow users to realize increased levels of detail and precision through the use of an electronically controllable laser 110, mounting apparatus 120, and galvanometer 140, each of which may be independently adjusted to provide increased levels of encoding precision.

Figure 3:
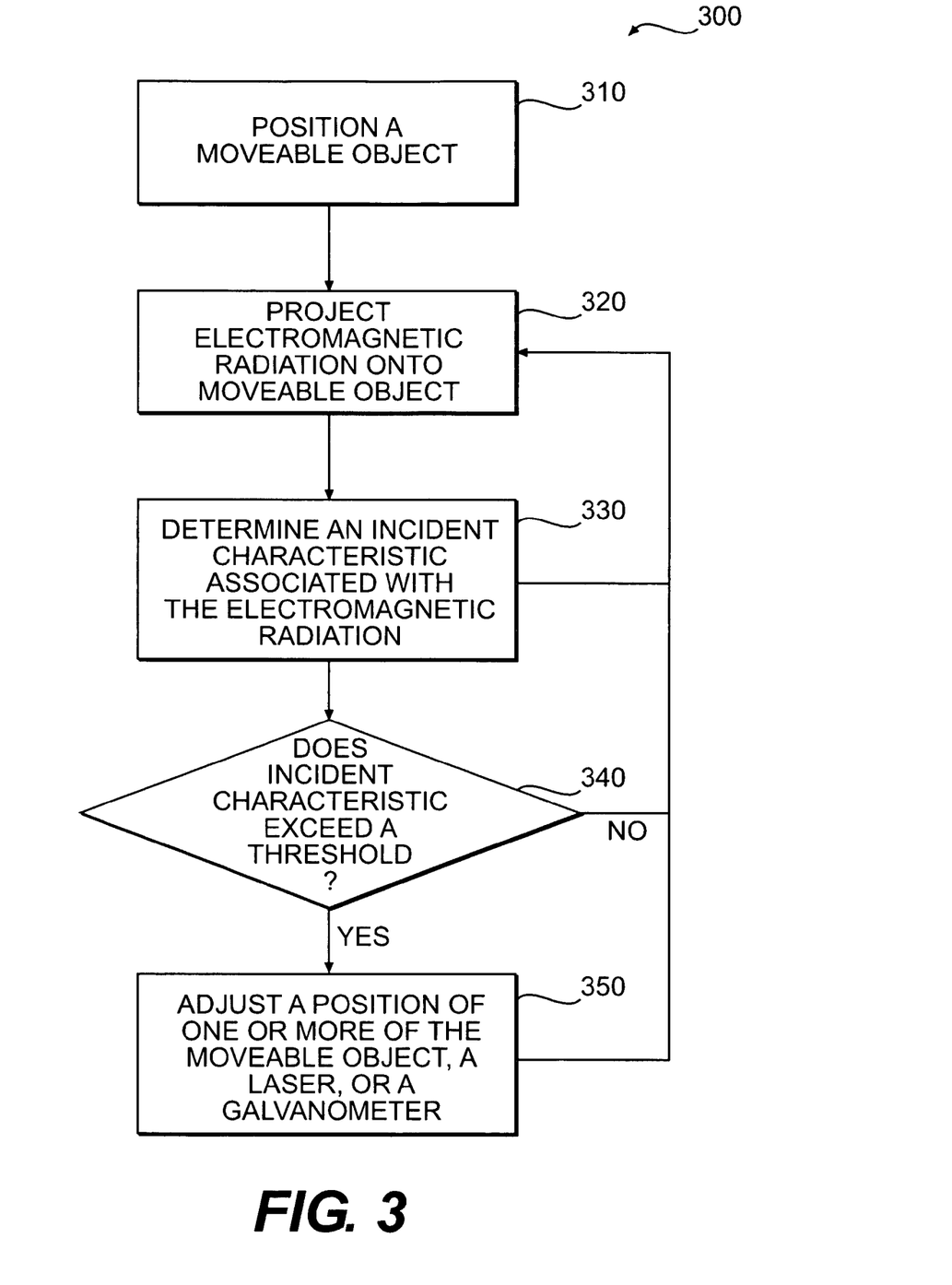
FIG. 3 provides a flowchart illustrating an exemplary disclosed method of operation associated with the system of FIG. 1.

FIG. 3 provides a flowchart 300 illustrating an exemplary method of encoding information onto moveable object 125 performed by system 100, consistent with the disclosed embodiments. As illustrated in FIG. 3, the method may include positioning moveable object 125 (Step 310). For instance, controller 130 may provide a reference signal to mounting apparatus 120 holding moveable object 125. The reference signal may adjust the position of mounting apparatus 120 relative to laser 110 to an initial position associated with a first portion of moveable object to be encoded with the desired pattern. In addition to initial positioning of moveable object 125, mounting apparatus 120 may position moveable object 125 in any arrangement relative to laser 110 that facilitates laser-encoding information onto the surface of the object.

Once moveable object 125 has been positioned, a beam of concentrated electromagnetic radiation may be projected onto a surface of moveable object 120 (Step 320). For example, laser 110 may receive a command from controller 130 and project the beam of radiation in response to the command. The power level associated with the beam may be predetermined (e.g., factory preset) or may be set by a user via an interface (not shown) associated with controller 130.

In one embodiment, galvanometer 140 may provide directional control of the beam of radiation provided by laser 110. As illustrated in FIG. 2A, galvanometer 140 may be communicatively coupled to controller 130 and configured to deflect the beam of concentrated electromagnetic energy in one or more directions based on commands received from controller 130. This may allow system 100 to provide directive control of electromagnetic radiation, so as to generate multiple markings on moveable object 125, without requiring positional adjustment of laser 110 or mounting apparatus 120 between adjacent markings.

While the beam of electromagnetic radiation is being projected onto the surface of moveable object 125, an incident characteristic associated with a present and/or future projection of the beam may be determined and/or estimated (Step 330). For example, as illustrated in FIG. 2A, while beam 210 is being projected onto the surface of moveable object 125, controller 130 may determine a distance (d1) and angle of incidence ($\theta_1$) associated with a present projection of the beam 210 in axial direction. Alternatively and/or additionally, as illustrated in FIG. 2B, controller may determine an angle of incidence ($\phi_1$) associated with the a present projection of the beam 210 in a circumferential direction. Similarly, controller 130 may estimate an angle of incidence ($\phi_2$) associated with a future projection of beam 210' in a circumferential direction.

Once the present/future incident characteristics have been determined/estimated, the incident characteristics may be compared with threshold values (Step 340). These threshold values may correspond to boundary values of each respective incident characteristic that, if exceeded, may result in improper, non-ideal, and/or inefficient performance of system 100 or components of system 100. For example, a threshold value associated with the axial distance of a beam of electromagnetic radiation may correspond to a distance limit, beyond which the beam may experience significant dispersion and/or attenuation. Similarly, a threshold value associated with an angle of incidence of a beam in the axial and/or circumferential direction may correspond to a critical angle that, if exceeded, may result in non-ideal marks due to beam spreading or drifting across the surface of moveable object 125. These threshold values may be stored in one or more memory devices of controller 130.

If the incident characteristics do not exceed a threshold value, system 100 may continue with the encoding of markings 201a-c onto moveable device 125 (Step 340: No). Alternatively, should one or more of the incident characteristics exceed a threshold value (Step 340: Yes), the position of one or more of the laser 110, the galvanometer 140, or the moveable object 125 (via mounting apparatus 120) may be adjusted. For example, if the distance associated with the beam of electromagnetic radiation exceeds the threshold distance value, laser 110 may be pulsed "off" and controller 130 may adjust the position of laser 110 and/or mounting apparatus 120 such that each incident characteristic remains within the limits of the respective threshold level. Once the positions are adjusted and aligned according to the desired pattern and the incident characteristics verified for compliance with the threshold levels, laser 110 may be pulsed on to continue the process of annealing the encoded information onto moveable object 125.

Figure 4:
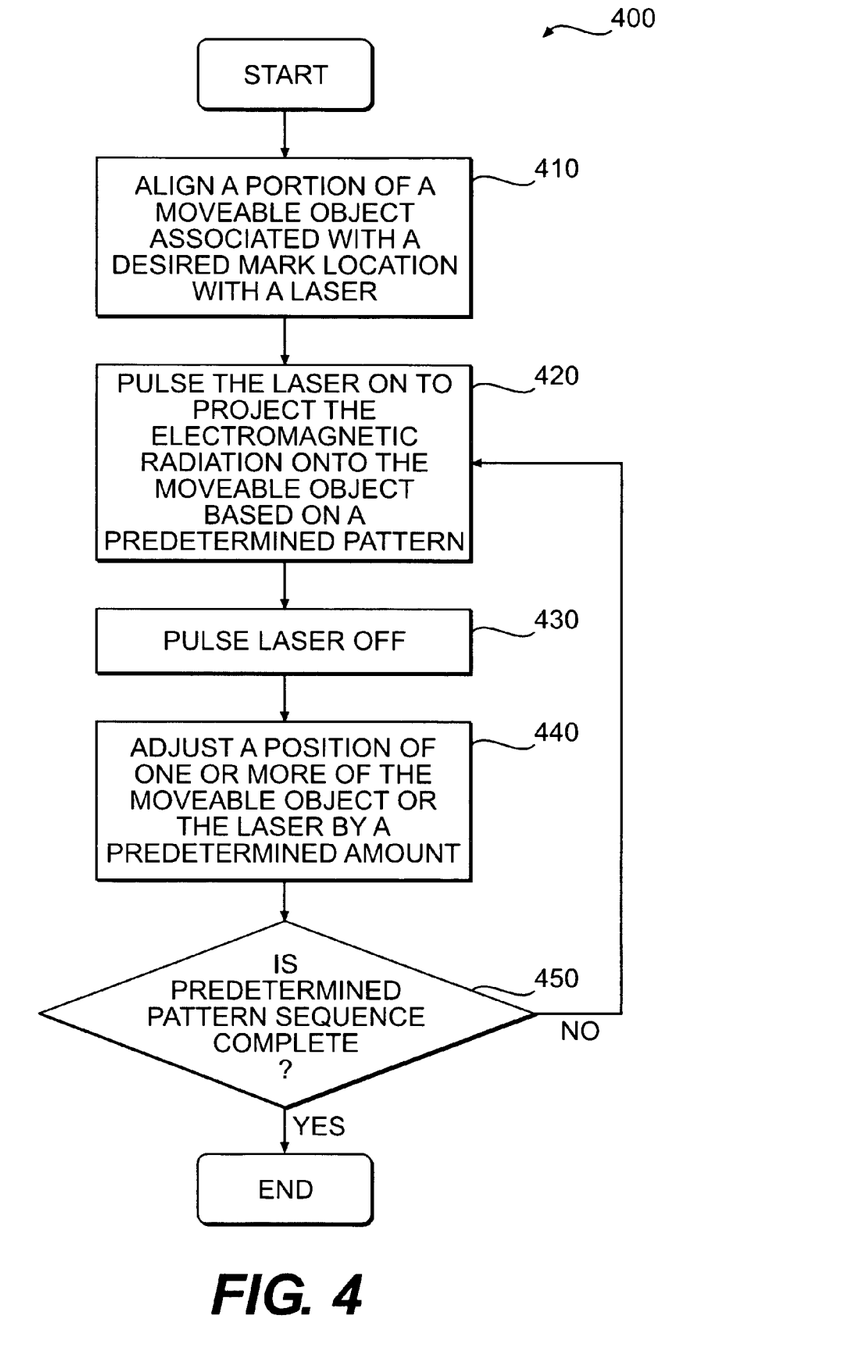
FIG. 4 provides a flowchart illustrating an exemplary disclosed method of operation associated with certain disclosed embodiments.

According to another exemplary embodiment, incident characteristics may be defined by a predetermined operational sequence associated with the controller. For example, the angles of incidence θ1 and θ1 may be held to substantially nominal values (e.g., 90°+/− some acceptable error). According to this embodiment, controller 130 may adjust laser 110 and/or moveable object 125 in a predetermined manner to project a predetermined pattern onto moveable object 125 without having to monitor one or more incident characteristics associated with the beam of electromagnetic radiation. FIG. 4 provides a flowchart 400 illustrating an exemplary method in accordance with the disclosed embodiment. As illustrated in FIG. 4, the method may be initiated by aligning a portion of moveable object 125 associated with a desired mark location with laser 110 (Step 410). For example, controller 130 may position moveable object 125 such that an angle of incidence in the axial direction of the beam of electromagnetic radiation is substantially 90° for the first mark associated with the predetermined mark pattern. Similarly, controller 130 may position moveable object 125 such that an angle of incidence in the circumferential direction of the beam of electromagnetic radiation is substantially 90° for the center of the first mark associated with the predetermined mark pattern. This predetermined marked pattern may be programmed into controller 130.

Once moveable object 125 and laser 110 are in alignment associated with a desired pattern, laser 110 may be pulsed on to project the electromagnetic radiation onto moveable object 125 based on the desired pattern (Step 420). For example, controller 130 may pulse laser 110 on to produce the first mark associated with the desired pattern. While laser 110 is pulsed on, controller 130 may adjust the position of one or more of moveable object 125, laser 110, or galvanometer 140 in order to maintain the angles of incidence θ1 and φ1 within the nominal values.

Once the first marking has been made, laser 110 may be pulsed off (Step 430). For instance, controller 130 may detect that the first marking associated with the desired pattern has been complete and provide a control signal to laser 110 to turn the beam of electromagnetic radiation off.

After laser 110 has completed the first marking and has been pulsed off, the position of one or more of moveable object 125, laser 110, and/or galvanometer 140 may be adjusted by a predetermined amount corresponding to a desired location of a subsequent marking associated with the desired pattern (Step 440). For instance, controller 130 may longitudinally adjust the position of moveable object 125 and/or laser 110 in predetermined increments to provide subsequent beams of radiation in accordance with the desired pattern.

Between subsequent pulses of radiation, controller 130 may determine whether the predetermined pattern sequence is complete (Step 450). For instance, controller 130 may monitor a progress associated with a program associated with the desired pattern. If the program has been completed (Step 450: Yes), controller 130 may end the pattern marking process and prepare moveable object 125 for unloading from mounting apparatus 120.

If, however, the program has not been completed (Step 450: No), controller 130 may pulse the laser on to project the beam of radiation onto the moveable object associated with subsequent markings of the desired pattern. As one of ordinary skill will recognize, Steps 420 through 450 may be repeated until the desired marking pattern is complete.

It is contemplated that multiple moveable objects may be laser encoded simultaneously according to embodiments consistent with the present disclosure. For example, by providing additional control signals to one or more additional mounting apparatuses 120 associated with additional moveable object 125 and using a beam splitter or multi-laser system, controller 130 may laser encode multiple moveable object simultaneously.

INDUSTRIAL APPLICABILITY

Although the disclosed system and method for laser-encoding information is described in connection with moveable objects, it is contemplated that the system and method may be implemented with any product or material that requires indelible implantation of encoded information. Specifically, processes consistent with the disclosed system and method may allow users to apply a barcode corresponding to position information associated with a hydraulic rod for a machine.

The presently disclosed method for laser-encoding information onto the surface of a moveable object may have several advantages. For example, because controller 130 may be configured to simultaneously, independently, and automatically control laser 110 and mounting apparatus 120 there may be more degrees of freedom for adjustment and orientation of moveable object 125. As a result, encoded information, including patterns with extremely small aspect ratios (e.g., in the 50-micron range) may be applied to moveable object 125 with precision and accuracy.

Additionally, because system 100 may determine and/or estimate incident characteristics associated with a present or future projection of a beam of electromagnetic radiation, adjustments may be made to system 100 in real-time to ensure that the pattern is accurately applied to the object. As a result, misalignments associated with beam attenuation, dispersion, and loss of focus may be proactively reduced during the laser-encoding process.

It will be apparent to those skilled in the art that various modifications and variations can be made to the disclosed system and method for laser-encoding information on a moveable object without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for encoding information on a movable object, the moveable object including a circumferential surface and a longitudinal axis, the system comprising:
a single laser optically coupled to a moveable object and configured to project concentrated electromagnetic radiation onto the moveable object, whereby the concentrated electromagnetic radiation heats a portion of the surface of the moveable object affected by the radiation so as to anneal the portion of the surface affected by the radiation, thereby modifying the reflective characteristics of the annealed portion; a mounting apparatus configured to adaptively position the moveable object relative to the laser; and a controller in communication with the laser and the mounting apparatus and configured to control one or more of the mounting apparatus and the laser to project a desired encoding pattern onto the moveable object, the controller being further configured to adjust a position of one or more of the moveable object and the laser if an incident characteristic associated with the electromagnetic radiation exceeds an incident threshold value.

2. The system of claim 1, wherein the moveable object includes a hydraulic rod.

3. The system of claim 1, wherein the laser includes a Q-switched, pulsed yttrium aluminum garnet laser.

4. The system of claim 3, wherein the laser is operated in the $TEM_0$ mode.

5. The system of claim 1, wherein the mounting apparatus is further configured to adjust the position of the moveable object relative to the laser in 50 micrometer increments.

6. The system of claim 1, wherein the desired encoding pattern includes a plurality of markings indicative of a position of the moveable object when the moveable object is placed within a cylindrical housing.

7. The system of claim 6, wherein the plurality of markings includes a barcode pattern with one or more circumferential lines extending axially along the moveable object, each circumferential line between 10 mm and 20 mm long and having an axial width of an integer multiple of 50 micrometers.

8. The system of claim 1, wherein the laser is optically coupled to the moveable object via a galvanometer configured to deflect the concentrated electromagnetic radiation in response to a control signal received from the controller, and wherein control of the laser is accomplished at least in part by control of the galvanometer.

9. A method for encoding information on a moveable object, the moveable object including a circumferential surface and a longitudinal axis, the method comprising:
positioning the moveable object relative to a laser configured to project concentrated electromagnetic radiation onto the moveable object; projecting, by the laser, the concentrated electromagnetic radiation onto the moveable object whereby the concentrated electromagnetic radiation heats a portion of the surface of the moveable object affected by the radiation so as to anneal the portion of the surface affected by the radiation, thereby modifying the reflective characteristics of the annealed portion; adjusting a position of one or more of the moveable object and the laser if an incident characteristic associated with the electromagnetic radiation exceeds an incident threshold value; and rotating a galvanometer with respect to an axis that is substantially parallel to the longitudinal axis of the moveable object so that the galvanometer deflects the electromagnetic radiation at least circumferentially across the moveable object.

10. The method of claim 9, wherein the moveable object includes a hydraulic rod.

11. The method of claim 9, wherein the incident characteristic associated with the electromagnetic radiation includes a distance between a source and the portion of the surface of the moveable object to be affected by the radiation.

12. The method of claim 9, wherein the incident characteristic associated with the electromagnetic radiation includes an angle of incidence between the surface of the moveable object and a line defined by the concentrated electromagnetic radiation.

13. The method of claim 9, wherein the positioning includes positioning the moveable object to a position relative to the laser such that the intensity of the concentrated electromagnetic radiation applied to the surface of the moveable object exceeds an intensity threshold value.

14. The method of claim 13, wherein the adjusting includes:
detecting a portion of energy reflected by the surface of the moveable object during the projection of the concentrated electromagnetic radiation onto the moveable object;
determining whether an intensity associated with the detected portion of reflected energy corresponds to an intensity of the concentrated electromagnetic radiation applied to the surface that exceeds the intensity threshold value; and
adjusting the position of the moveable object such that the intensity of the concentrated electromagnetic radiation applied to the surface of the moveable object exceeds an intensity threshold value.

15. The method of claim 14, wherein the adjusting includes rotating the moveable object in a circumferential direction.

16. The method of claim 14, wherein the adjusting includes shifting the moveable object in an axial direction.

17. The method of claim 9, wherein the projecting includes projecting concentrated electromagnetic radiation onto the moveable object to project a desired encoding pattern onto the moveable object.

18. The method of claim 17, wherein the desired encoding pattern includes a plurality of markings indicative of a position of the moveable object when the moveable object is placed within a cylindrical housing.

19. The method of claim 17, wherein the desired encoding pattern includes a barcode pattern having one or more circumferential lines extending axially along the moveable object, each circumferential line between 10 mm and 20 mm long and having an axial width of an integer multiple of 50 micrometers.

20. A method for encoding information on a moveable object, the moveable object including a circumferential surface and a longitudinal axis, the method comprising:
receiving, by a controller, a pattern to be projected onto the surface of a moveable object; positioning the moveable object relative to a laser configured to project concentrated electromagnetic radiation onto the moveable object; projecting, by the laser, the concentrated electromagnetic radiation onto the moveable object whereby the concentrated electromagnetic radiation heats a portion of the surface of the moveable object affected by the radiation so as to anneal the portion of the surface affected by the radiation, thereby modifying the reflective characteristics of the annealed portion; and adjusting a position of a galvanometer and one or more of the moveable object and the laser to project a desired encoding pattern onto the moveable object, the galvanometer being adjusted to deflect the concentrated electromagnetic radiation at least circumferentially across the moveable object based on a control signal from the controller; wherein adjusting the position of the galvanometer includes rotating the galvanometer with respect to an axis that is substantially parallel to the longitudinal axis of the moveable object.

21. The method of claim 20, wherein the desired encoding pattern includes a barcode pattern having one or more circumferential lines extending axially along the moveable object.

* * * * *